United States Patent [19]

Akatsu et al.

[11] 4,248,095
[45] Feb. 3, 1981

[54] METHOD OF AND SYSTEM FOR MEASURING PHYSICAL QUANTITIES OF A ROTATING BODY AT MANY POINTS THEREOF

[75] Inventors: Toshio Akatsu, Ushikumachi; Kazuto Kinoshita, Yatabemachi; Toshimitsu Fujiyoshi, Kashiwa, all of Japan

[73] Assignee: Hitachi, Ltd., Japan

[21] Appl. No.: 63,445

[22] Filed: Aug. 3, 1979

[30] Foreign Application Priority Data

Aug. 9, 1978 [JP] Japan .................................. 53-96233

[51] Int. Cl.³ ........................ G01B 7/18; G08C 15/10
[52] U.S. Cl. ........................................ 73/771; 73/351; 340/870.13
[58] Field of Search ................ 73/771, 773, 340, 341, 73/342, 351; 340/182, 183

[56] References Cited

U.S. PATENT DOCUMENTS

| | | | |
|---|---|---|---|
| 2,800,790 | 7/1957 | Schover | 73/771 |
| 3,197,565 | 7/1965 | Yoder et al. | 340/183 X |
| 3,796,993 | 3/1974 | Fox et al. | 340/182 X |
| 3,876,998 | 4/1975 | Richter et al. | 340/183 X |
| 3,886,787 | 6/1975 | Akatsu et al. | 73/771 |

*Primary Examiner*—James J. Gill
*Attorney, Agent, or Firm*—Craig & Antonelli

[57] ABSTRACT

A method and system are disclosed for measuring physical quantities of a rotating body at many points thereof in a contact-free manner. The present measurement comprises electromagnetically applying control signals to the rotating body outside the body and taking out such physical quantities as mechanical strains, temperatures, etc. at many points of a rotating body with high accuracy, in a desired manner irrespective of the revolution of the body. Detecting circuits for detecting physical quantities such as mechanical strains or temperatures of a rotating body are additively and detachably provided at many measuring points of the body. The rotating body is also provided with electronic switches which can be arbitrarily changed over by control signals transmitted electromagnetically from the stationary side. The output signals from the detecting circuits are switched over by the electronic switches and transmitted electromagnetically to the stationary side.

9 Claims, 10 Drawing Figures

METHOD OF AND SYSTEM FOR MEASURING PHYSICAL QUANTITIES OF A ROTATING BODY AT MANY POINTS THEREOF

This invention relates to a method and system for measuring physical quantities such as mechanical strains or temperatures at many points of a rotating member or part of a rotary machine such as in a power plant.

A prior art example of this kind of a method for measuring physical quantities at many points of a rotating body, is described in U.S. Pat. No. 3,886,787 owned by the present assignee. According to this patent, the rotating body is provided with electronic switches, output voltages of many detecting circuits provided at the many points are selected through the change-over of the electronic switches in any order by light signals sent from the stationary side, and the selected output voltages are transmitted to the stationary side so as to measure them. In that example, electric power to feed the electronic switches and the detecting circuits provided on the rotating body is supplied from the stationary side through the combination of slip ring and brush. Also, the output voltages selectively changed over by the electronic switches are taken out to the stationary side through a similar combination of slip ring and brush.

The above-referenced method, however, has the following problems.

(1) Since the method cannot be free from slip rings and brushes, it cannot be applied to the rotary machine which cannot be provided with slip rings and brushes for example because the axis end of the rotor is not available and moreover its liability to noise generated by the slip rings and brushes adversely sets a limit to the maximum rotational speed of the rotating body.

(2) Since the maximum speed of changing over the electronic switches is restricted to the rotational speed of the rotating body, the changes-over of the switch take place at most once per rotation of the rotating body. Thus, since arbitrary sampling is not possible the substantially simultaneous measurement of dynamically changing physical quantities at more than one point is impossible.

Another prior art example, which differs from the above described method in that it uses no slip ring and brush, is a frequency-division multiplexing method in which output voltages of a number of detecting circuits are multiplexed by employing a telemetering system. The frequency-division multiplexing method, is generally called a dual-modulation system or FM—FM transmission system in which the rotating body is provided with a number of oscillators for generating subcarrier waves having different frequencies $f_o$ to $f_n$ which are all much lower than a radio frequency $f_c$ of a main carrier, the subcarrier waves are modulated with the levels of data representing desired physical quantities, and the modulated subcarriers are then modulated on the main carrier and transmitted in a batch to the stationary side.

With this system, the possible maximum frequency response at which the data representing the physical quantities is transmitted from the rotor to the stator side, depends on the frequencies of the subcarriers so that the respective channels have different frequency characteristics. As a result, the frequency characteristics of the physical quantities in the rotating body must be analyzed in advance of the measurement. That is, the data having low transmission frequencies must be sent through channels suitable for low subcarrier frequencies and the data having high transmission frequencies must be transmitted through channels for high subcarrier frequencies. Therefore, if the analysis of the mechanism fails with respect to some physical quantities, they may be associated with wrong channels, so that an accurate measurement becomes impossible. When such a fault occurs, the rotating body must be brought to a halt and the data must be reconnected with suitable channels for the corresponding subcarrier frequencies. This is a problem inherent to this method.

Also, with this prior art method, the increase in the number of measuring points causes the increase in the number of subcarriers to be used. Consequently, the associated radio frequency $f_c$ must be so high that the method fails to be practical. In a practical case, this method can treat at best about ten measurement points and high-accuracy measurement including more points is very difficult because of increase of inter-channel interference and adverse effects due to channel capacitance.

An object of this invention is to provide a method of and system for measuring physical quantities of a rotating body at many points on the body, in which electronic switch means provided on a rotating body are arbitrarily changed over irrespective of rotation or the rotational speed of the rotating body by control signals transmitted from the stationary side to the rotary side in a contact-free manner so that the sampling rates associated with the respective measuring points are arbitrarily selected by the switch means controlled independently of the rotation of the body, whereby a slowly varying characteristic and a rapidly varying characteristic in the physical quantities at many points on the rotating body can suitably measured with high accuracy.

According to the feature of this invention, to achieve the above object, control signals for changing over signal switching elements of electronic switch means provided on the rotating body with its switching elements connected with detecting circuits attached to the rotating body are electromagnetically transmitted from outside the rotating body and the measured physical quantities are selected by the switching elements and are electromagnetically taken out of the body in a different sequence externally controllable at any time whereby a slowly varying characteristic and rapidly varying characteristic of physical quantities at many points of the rotating body can be selectively sampled and substantially simultaneously measured in no relation to the revolution of the body.

The present invention will be apparent from the following description taken in conjunction with the accompanying drawings, in which:

FIG. 6 is a diagram in which FIG. 5 is in part shown in a cross section taken along line VI—VI thereof;

FIG. 9 is a diagram in which FIG. 7 is in part shown in a cross section takin along line IX—IX in FIG. 8;

In the following, an embodiment of this invention will be described as applied to the case where mechanical strains at many points of a rotating body are measured by the use of strain gages, by way of example.

Figure 1:
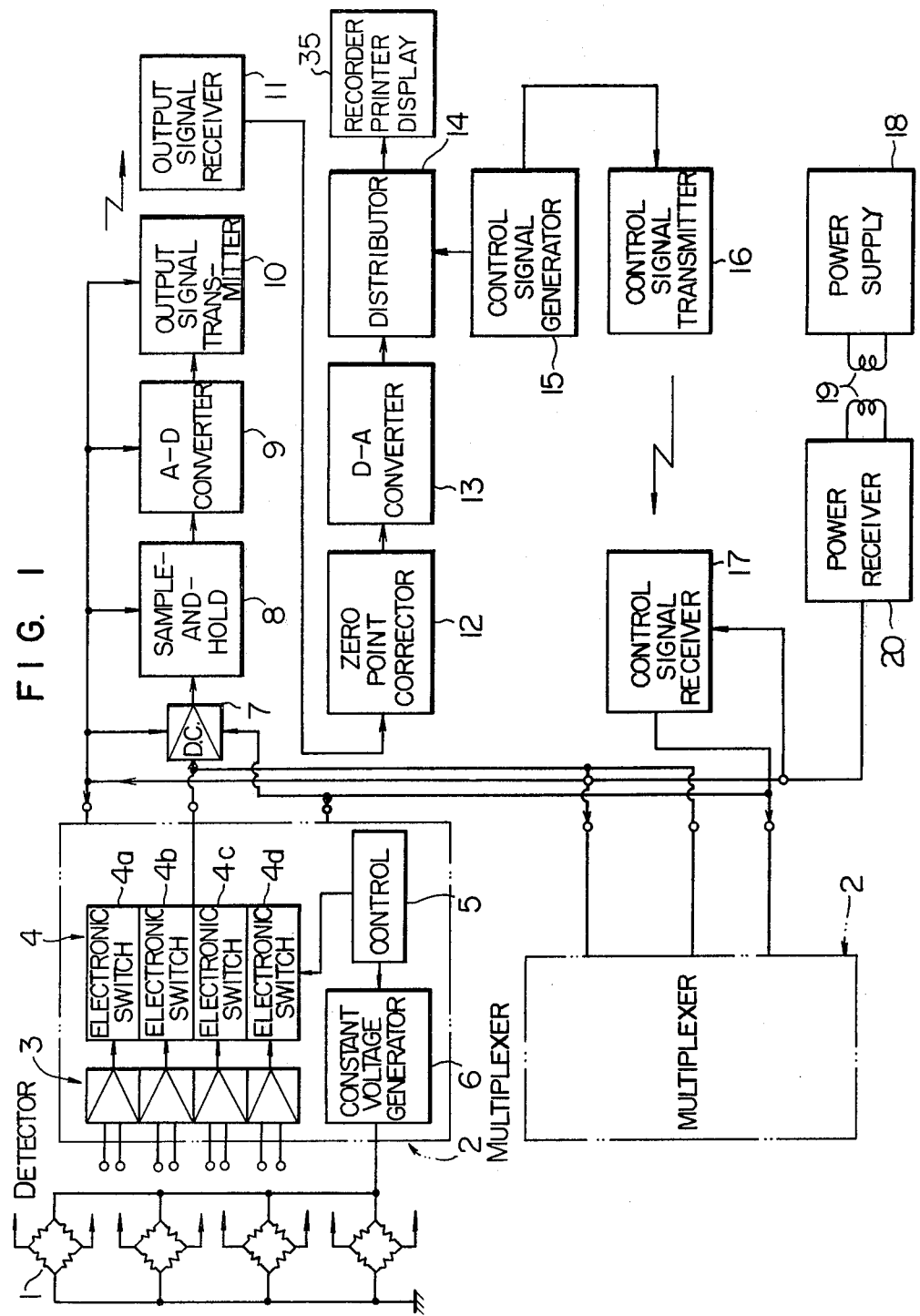
FIG. 1 is a block diagram of a measuring system for measuring physical quantities at many points of a rotating body, as an embodiment of this invention.

In FIG. 1 there is shown a block diagram of a measuring system for carrying out the method of this invention, in which provided on a rotating body are detecting circuits 1 each using strain gages and provided for individual measuring points and a plurality of multiplexers 2, each comprising four amplifiers 3 connected respectively with the output terminals of the detecting circuits, an electronic switch having four switching elements 4a-4d such as analog switches for four channels and subjecting the signals amplified by the amplifiers 3 to time-division, a control circuit 5 for controlling the operation of the electronic switch 4, and a constant voltage generating circuit or automatic voltage regulator 6 for generating a constant voltage necessary to operate the detecting circuits 1 in response to the electrical signal from the control circuit 5. In the embodiment shown in FIG. 1, the multiplexer 2 is so designed as to perform the time-division measurement of physical quantities at four measuring points. For the measurement of physical quantities at more than four points, n multiplexers must be provided for [4(n−1)+i] measuring points, where n is any positive integer and i equals 1, 2, 3 or 4. Mounted in the rotating body are a dc amplifier 7 with variable gain, a sample-and-hold circuit 8, an A-D converter 9 for converting analog electrical signals to digital ones, and an output signal transmitter 10 for frequency-modulating and transmitting the output signal of the A-D converter 9 to the stationary side in a contact-free manner using electromagnetic waves, as described later. Provided outside the body are an output signal receiver 11 for receiving the output signal transmitted from the output signal transmitter 10, a zero point correcting circuit 12 for automatically correcting the shifts of the zero points of the detecting system, which detecting system comprises the multiplexer 2, the dc amplifier 7, the sample-and-hold circuit 8, the A-D converter 9 and the output signal transmitter 10, a D-A converter 13, a distributor 14 for distributing the output voltages of the detecting circuits which are transmitted time-sequentially thereto, to the corresponding measuring channels in response to the control signal generated by a control signal generator 15, an output means 35 such as a recorder, printer and display for receiving the output of the distributor and recording and displaying the measured physical quantities, and a control signal transmitter 16 for electromagnetically transmitting the control signal to control the multiplexer 2 and to set the variable gain of the dc amplifier at a value, from the stationary side to the rotary side. A control signal receiver 17 is provided to receive at the rotary side the control signal transmitted from the control signal transmitter 16 by electromagnetic coupling. The system comprises a power supply means 18 for transmitting electric power necessary for energizing the respective electrical means provided on the rotating body, from the stationary side to the rotary side in an AC-coupling manner through the use of electromagnetic induction elements such as coils 19, and a power receiving means 20 for receiving on the rotary side the electric power transmitted by the power supply means 18 and for converting the received power to a dc voltage.

Figure 2:
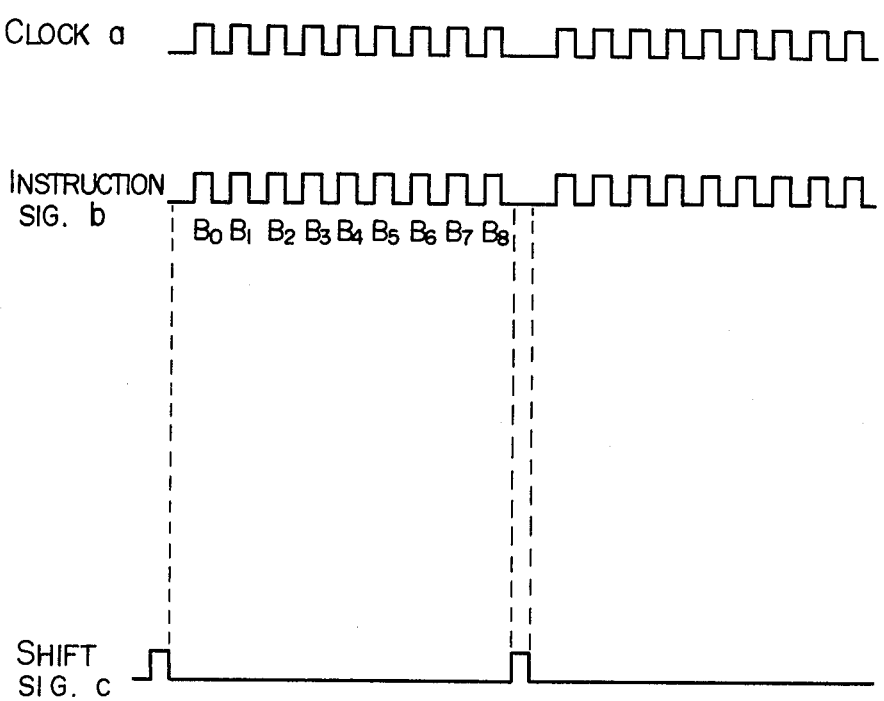
FIG. 2 illustrates the waveforms of control signals used in this invention.

FIG. 2 shows control signals, i.e. a clock signal a, an instruction signal b and a shift signal c. The clock signal a serves to temporarily store the instruction signal b in a shift register (at 21 in FIG. 3) mentioned later. The instruction signal b is composed of 9 bits, i.e. bits $B_0-B_8$. Of the 9 bits, two bits $B_0$ and $B_1$ are used as a signal for selecting one of the variable gains of the dc amplifier 7, four bits $B_3-B_6$ are used as a change-over signal for setting one of the plural multiplexers 2 in operation, and the bits $B_7$ and $B_8$ are used as an instruction signal for turning on the selected one of four channel switching elements 4a-4d of each multiplexer 2, and the bit $B_2$ as an on-off signal for on-off operating the voltage generator 6 of the selected multiplexer. It should here be noted that if more multiplexers 2 are used, the number of bits of the change-over signal, which consists of bits $B_3-B_6$ in the embodiment described above, may be increased. The shift signal c serves to shift the signals applied to the input terminals of latch circuits to the output terminals thereof.

Figure 3:
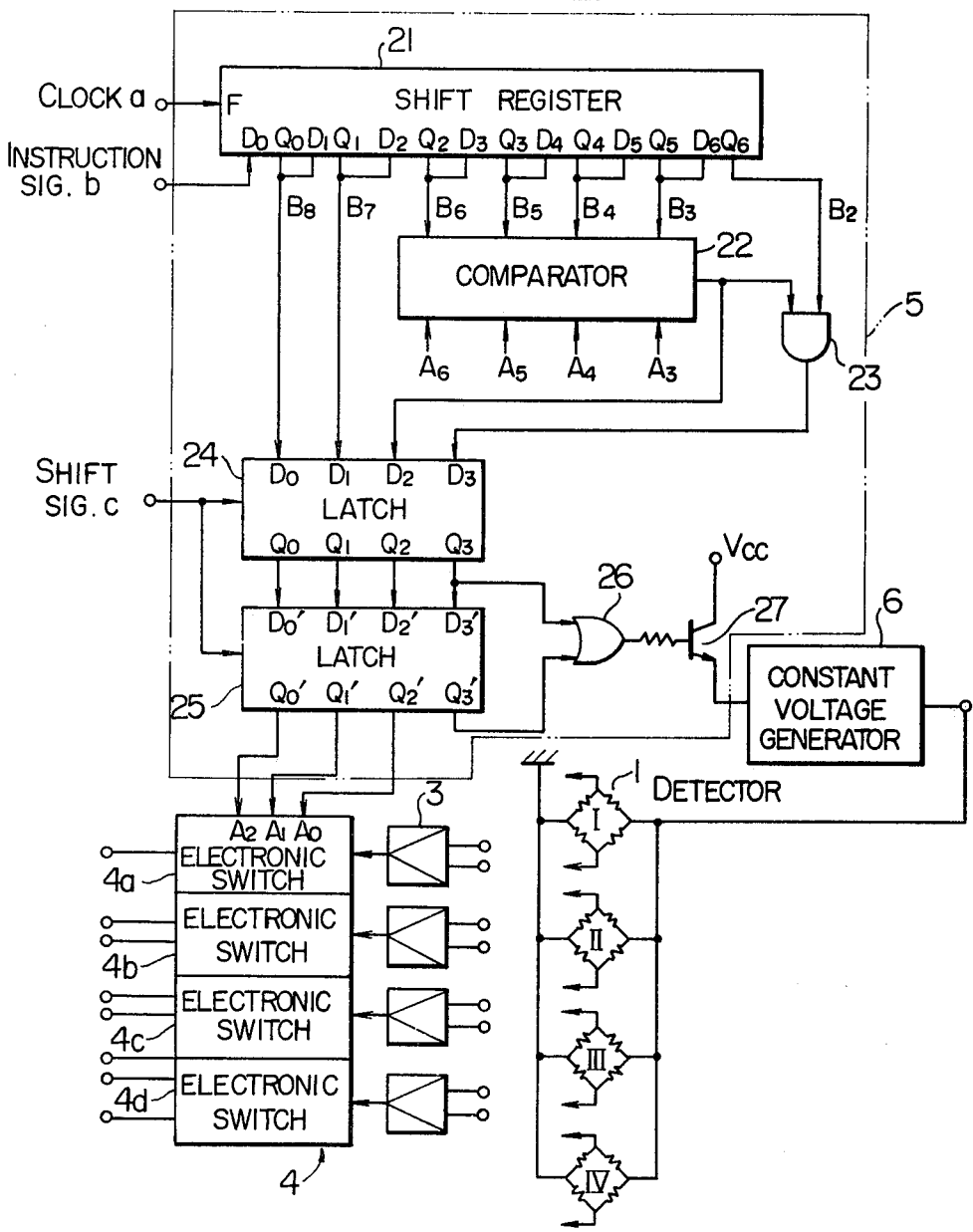
FIG. 3 shows in detail an example of the control circuit in the multiplexer shown in FIG. 1.

FIG. 3 shows in detail the control circuit 5 of the multiplexer unit 2, in which parts or elements equivalent to those shown in FIG. 1 are indicated by the same reference numerals as in FIG. 1.

Reference numeral 21 designates a shift register. When the shift register 21 receives the clock signal a at its terminal F and the instruction signal b at its terminal $D_o$, the seven bits $B_2-B_8$ of the instruction signal b are temporarily stored in the shift register 21 (at this time the two bits $B_0$ and $B_1$ overflow the register 21) and shifted to its terminals $Q_0-Q_6$, respectively. A comparator 22 serves to compare the digital signal, i.e. the bits $B_3-B_6$ of the instruction signal b, with a digital signal of bits $A_3-A_6$ which designate the addresses of the plural multiplexers 2. The comparator 22 delivers an output "1" at its output terminal only when there is a coincidence or match between the two digital signals compared, and an output "0" otherwise. An AND circuit 23 delivers an output "1" only when both the output signal at the terminal $Q_6$ of the shift register 21 and the output signal of the comparator 22 are "1". Latch circuits 24 and 25 operate as follows. When the shift signal c is applied to the latch circuits 24 and 25, the signals at the terminals $Q_0-Q_3$ the latch circuit 24 are shifted to the terminals $D_0'-D_3'$ of the latch circuit 25 while the signals at the terminals $D_0-D_3$ of the latch circuit 24 are shifted to the terminals $Q_0-Q_3$ of the latch circuit 24. An OR circuit 26 delivers an output "1" when any one of the outputs is delivered at the output terminals $Q_3$ and $Q_3'$ of the latch circuits 24 and 25. When the OR circuit 26 delivers the output "1" an electronic switch 27 is turned on to activate the constant voltage generator 6.

Figure 4:
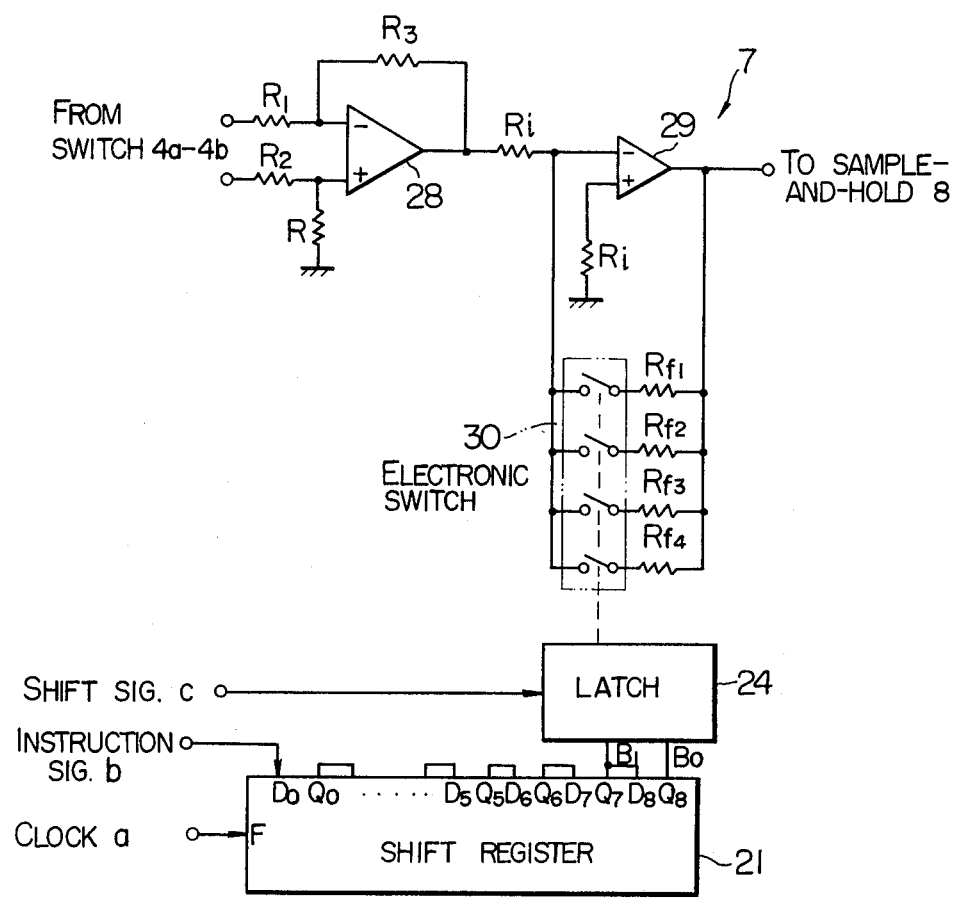
FIG. 4 shows in detail an example of the dc amplifier shown in FIG. 1.

FIG. 4 shows in detail a circuit of the dc amplifier 7 commonly used for the multiplexers 2. In FIG. 4, an operational amplifier 28 has input resistors $R_1$ and $R_2$ and a feedback resistor $R_3$ with a constant amplification factor and an operational amplifier 29 has a variable amplification factor expressed by $R_f/R_i$, where $R_f$ and $R_i$ represent the resistance values of the feedback resistor $R_f$ and the input resistor $R_i$, respectively. The feedback resistor is selected from resistors $R_{f1}$ to $R_{f4}$ under control of an output of the latch circuit 24. An electronic switch 30 incorporates electronic switching elements for four channels therein. The amplification factor of the operational amplifier 29 is determined, therefore, by turning one of the electronic switching elements on in response to the output of latch circuit 24 to set a corresponding one of resistors $R_{f1}$ to $R_{f4}$.

Now, description will be made of how any one of the switching elements of the electronic switch 30 is selectively turned on.

The instruction signal b consisting of 9 bits, as shown in FIG. 2, is temporarily stored in the shift register 21. Of the 9 bits, the two bits $B_0$ and $B_1$ at the terminals $Q_7$ and $Q_8$ of the shift register 21 are shifted to the latch circuit 24 in response to the arrival of the clock signal a at the terminal F. Any desired one of the switching elements 4a–4d of the electronic switch 30 is turned on by means of a decoder (not shown) in accordance with the two-bit instruction b. Since the operational amplifier 29 is so designed as to have a variable amplification factor, the maximum level of the output of each of the detecting circuits 1 having different output voltage amplitudes can be raised nearly to the rated input level of the A-D converter 9 so that the accuracy of the conversion from analog to digital quantity is much improved.

Figure 5:
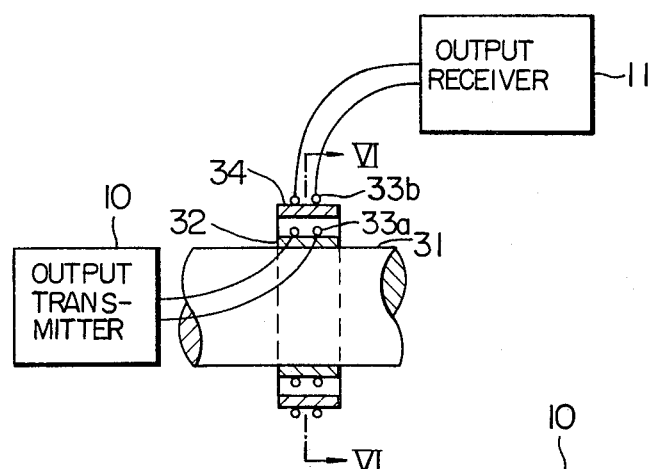
FIG. 5 is a schematic diagram of a portion of a measurement system used in this invention which includes an output signal transmitter for transmitting output signals from the rotary side to the stationary side and an output signal receiver for receiving the transmitted output signals.
Figure 6:
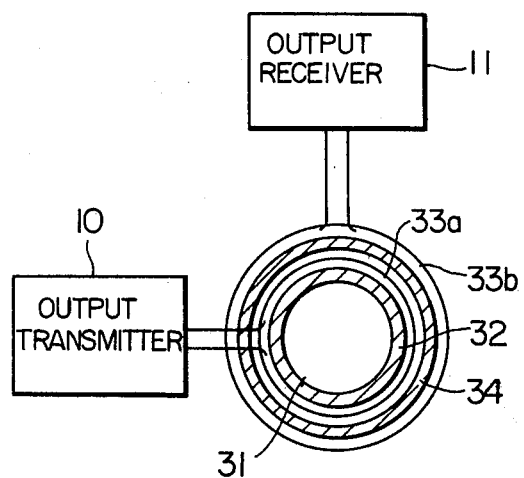

FIG. 5 and 6 show in detail the output signal transmitter 10 and receiver 11 shown in FIG. 1, for transmitting the output signals from the rotary side and receiving the transmitted signal on the stationary side, respectively. As shown in FIGS. 5 and 6, a rotary shaft 31 of a rotary machine is provided with an inner ring 32 of non-magnetic material fixed thereon, turns of conductor 33a being wound on the outer surface of the inner ring 32, and an outer ring 34 of non-magnetic material is disposed concentric with and spaced from the inner ring 32, turns of conductor 33b being wound also on the outer surface of the outer ring 34. These wound conductors 33a, 33b constitute a transmitter winding and a receiver winding, respectively, both of which are in an electromagnetically-coupled relation.

Figure 7:
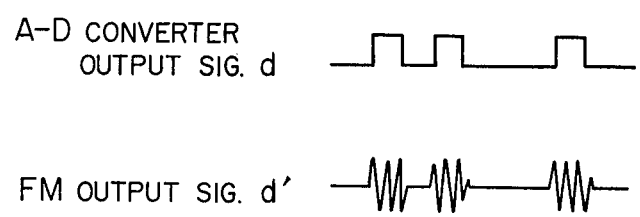
FIG. 7 is a diagram showing waveforms of the output signals respectively supplied to and delivered from the output signal transmitter as shown in FIG. 5.

The operations of the output signal transmitter 10 and receiver 11 will now be described. When a digital signal d having a waveform as shown in FIG. 7 from the A-D converter 9, is applied to the input terminal of transmitter 10. In the transmitter 10, a carrier is on-off modulated or frequency-modulated with the A-D converted signal d into a signal d' shown in FIG. 7 and then is delivered at the output terminal of the transmitter 10. Upon the application of the FM-signal d' to the conductor 33a wound on the inner ring 32 on the rotary side, a voltage corresponding to the signal d' is induced in the conductor 33b wound on the outer ring 34 on the stationary side. The induced voltage signal is amplified and rectified by the output signal receiver 11 so that a voltage corresponding to the signal d is obtained at the output terminal of the receiver 11. Namely, the output signals of the A-D converter 9, i.e. signals representing the measured quantities, on the rotary side can be transmitted and electromagnetically coupled to the stationary side, irrespective of the rotation, e.g., the rotational speed of rotating body in a contact-free manner.

Figure 8:
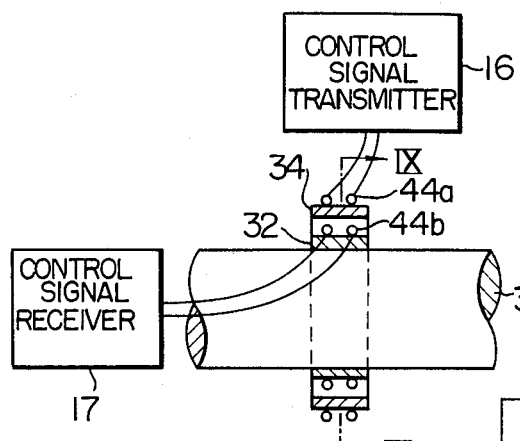
FIG. 8 is a schematic diagram showing another aspect of measurement of this invention including a control signal transmitter for transmitting control signals from the stationary side to the rotary side and a control signal receiver for receiving the transmitted control signals.
Figure 9:
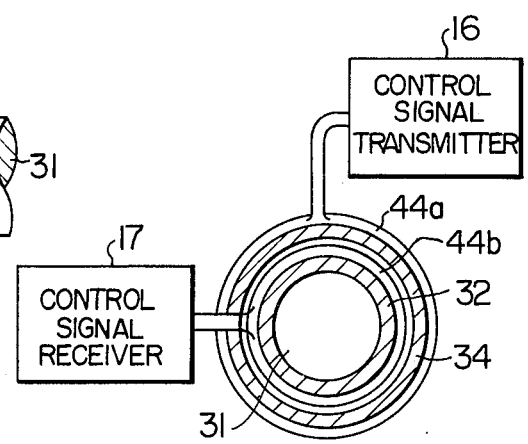

FIGS. 8 and 9 show in detail a control signal transmitter 16 for transmitting a control signal from the stationary side to the rotary side and a control signal receiver 17 for receiving the transmitted signal on the rotary side. In FIGS. 8 and 9, the same reference numerals are applied to like parts as in FIGS. 5 and 6. The transmitter 16 and the receiver 17 are different from those shown in FIGS. 5 and 6 only in that they are oppositely located, that is, the control signal transmitter 16 is disposed on the stationary side and the control signal receiver 17 on the rotary side. A control-signal transmission winding 44a is provided on the outer ring 34 and a reception winding 44b is provided on the inner ring 32.

Figure 10:
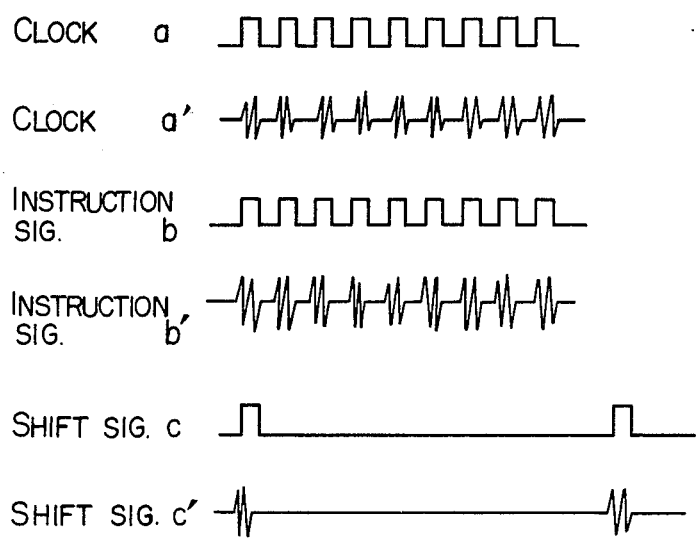
FIG. 10 shows waveforms of the control signals respectively supplied to and delivered from the control signal transmitter as shown in FIG. 8.

The operations of the transmitter 16 and the receiver 17 will be described below. The control signal transmitter 16 receives a clock signal a delivered from the control signal generator 15 and having such a waveform equivalent to that of FIG. 2 as shown in FIG. 10. The clock signal a is subjected to frequency modulation and delivered in the form of a clock signal a' having a waveform shown in FIG. 10. When a current corresponding to the frequency-modulated signal a' is caused to flow through the conductor 44a wound around the outer ring 34 on the stationary side, a voltage corresponding to the clock signal a' is electromagnetically induced in the conductor 44b wound around the inner ring 32 on the rotary side. The induced voltage is amplified by the output signal receiver 17, the amplified voltage is then rectified and a voltage corresponding to the clock signal a is obtained from the output terminal of the receiver 17. Consequently, the control signal can be transmitted from stationary to rotary side, irrespective of the rotational speed of the rotating body in a contact-free manner.

In order to transmit the instruction signal b and the shift signal c from stationary to rotary side, two more sets, each similar to that shown in FIG. 8 or 5 comprising a transmitter and a receiver and the associated electromagnetic coupling means, must be provided. The signals b' and c' are those obtained by rectifying the clock signals b and c, just as in the case of the clock a.

Next, description will be given of how the switching element 4a for the first channel of the electronic switch 4 provided in the first multiplexer 2 shown in FIG. 1 or 3 is actuated.

First, to actuate the electronic switch 4 of the first multiplexer 2, the four bits $B_3$–$B_6$ as the outputs of the shift register 21 are all rendered to zero and all the inputs to the terminals $A_3$–$A_6$ of the comparator 22 are also chosen to be zero. Further, to actuate the first channel electronic switching element 4a, both the two bits $B_7$ and $B_8$ as the outputs of the shift register 21 are so chosen as to be zero. Namely, the part of the instruction signal b, consisting of the 7 bits $B_2$–$B_8$ is chosen to be "1000000" and this partial instruction signal is temporarily stored in the shift register 21 so that signals 0, 0, 1 and 1 are applied respectively to the terminals $D_0$–$D_3$ of the latch circuit 24. When the shift signal c is applied to the latch circuit 24 with the above condition maintained, the signals 0, 0, 1 and 1 are shifted respectively to the terminals $D_0'$–$D_3'$ of the latch circuit 25. Accordingly, the OR circuit 26 delivers an output "1", which turns the electronic switch 27 on so that a voltage of $V_{cc}$ is applied to the input terminal of the constant voltage generating circuit 6. The circuit 6 delivers at its output terminal a constant voltage to be applied to the detecting circuit 1. In like manner, to turn on the second channel electronic switching element 4b of the electronic signal, the above partial instruction signal consisting of the bits $B_2$–$B_8$ of the instruction signal b is rendered to be "1000001" and if this partial signal "1000001" is temporarily stored in the shift register 21, signals 1, 0, 1 and 1 are applied respectively to the terminals $D_0$–$D_3$ of the latch circuit 24. If the shift signal c is applied to the latch circuit 24 under this condition, the signals to select the first channel electronic switching element 4a are shifted to the terminals $Q'_0$–$Q'_3$ of the latch circuit 25 and simultaneously the signals to select the second channel switching element 4b is shifted to the terminals $Q_0$–$Q_3$ of the latch circuit 24. As a result, a signal "1" is delivered from the terminal $Q'_2$ of the latch circuit 25 and applied to the terminal $A_0$ of the electronic switch 4 so that the switch 4 is driven into the operating state. Then, the first channel switching element 4a is turned on in response to the signals received at the terminals $A_1$ and $A_2$, whereby the switch 4 delivers the output voltage of the first amplifier 3. If the instruction signal b is applied to the shift register 21 at this stage, a voltage is applied to the detecting circuit 1 at the instant that the shift signal c is applied anew to the latch circuit 24 immediately after the application of the instruction signal b to the shift register 21. Then, the output voltages of the detecting circuits 1 are switched over by the shift signal c arriving after the application of the next instruction signal b to the shift register 21.

Thus, the order in which the switching elements 4a–4d of the electronic switch 4 are selectively turned on, can be arbitrarily determined by the control signal sent from the stationary side. Therefore, the number of measurements performed per unit time may be increased for each of the measured quantities varying fast with time and also decreased for each of the measured quantities varying slowly with time. This assures effective measurements matched to the frequencies of the fluctuations of the quantities to be measured, and substantially simultaneous measurements of a physical quantity at plural measuring points. Further, since the voltage supplied to the detecting circuits 1 can be arbitrarily turned on and off by the control signal, the capacity of the power source can be relatively small even in the case where the rotating body has many measuring points thereon. Since each of the detecting circuits is not continuously supplied with power, a fatal fault which might be caused as a result of the accidental short-circuiting of some one of the detecting circuits and in which no measurement can be performed, will be prevented.

Finally, the automatic correction of the zero points of the whole measuring system except the detecting circuits 1 will be described.

Reference should now be made to FIG. 1 for a better understanding of the following description. When the output voltages of the detecting circuits 1 are measured by the output signal receiver 11 with no voltage applied to the detecting circuits 1, the measured value given by the receiver 11 equals the algebraic sum of the zero outputs, i.e. the amounts of shifts of zero points, of the amplifiers 3, the electronic switch 4, the dc amplifiers 7, the sample-and-hold circuit 8 and the A-D converter 9, the algebraic sum being represented by $E_0$. A voltage is supplied to the detecting circuits 1 on the rotary side from the power supply means 18 on the stationary side through the induction coils 19 and the power receiving means 20. The output voltages of the detecting circuits 1 are measured when there is no strain in the rotating body, the measured voltage being represented by $E_1$. The measured voltages $E_0$ and $E_1$ are temporarily stored in the zero point correcting circuit 12. Further, the output voltages of the detecting circuits 1 are measured when strains are generated in the rotating body, the measured voltage being represented by $E_2$. Under this assumption, the voltage that is to be measured in practice is given by the expression:

$$E = E_2 - E_1 - E_0$$

where $E_1$ is a value proper to each detecting circuit and therefore constant, but $E_0$ may vary depending on, for example, the fluctuation of ambient temperature and therefore must be remeasured at appropriate intervals.

According to an embodiment of this invention, each multiplexer 2 can cover the measurements of physical quantities at four measuring points and the measurements of physical quantities at 256 points, for example, can be accomplished by the use of 64 multiplexers. Moreover, the size and the weight of one multiplexer used in this invention can be less than those of an ordinary one and it can be divided into several pieces to be attached onto desired positions of the rotating body, so that it can withstand a very great centrifugal acceleration.

According to the method for measuring physical quantities at many points of a rotating body, as an embodiment of this invention, the control signals to selectively turn on the electronic switching elements provided on the rotating body and connected with the detecting circuits are transmitted from stationary to rotary side irrespective of the rotational speed of the rotating body in a contact-free manner and the signals representing the measured quantities and selected by the electronic switching elements are also transmitted from rotary to stationary side irrespective of the rotational speed of the rotating body in a contact-free manner, so that the changes in physical quantities at many points of the rotating body can be selectively measured in no relation to the revolution of the body. Consequently, suitable sampling rates can be set for the respective measuring points so that different characteristics varying slowly and varying rapidly with time in the physical quantities can be accurately and substantially simultaneously measured.

Further, this invention does not need any combination of slip ring and brush and therefore is free from noise, making it possible to measure physical quantities at many points of a body rotating at high speeds with high precision.

What is claimed is:

1. A method of measuring physical quantities of a rotating body at many measuring points thereof, comprising the steps of:
    (a) converting said physical quantities to corresponding electrical signals by detecting devices provided at said measuring points,
    (b) changing over switching means incorporated in said rotating body and connected with output terminals of said detecting devices, in response to control signals from outside of said rotating body so as to serially deliver said electrical signals,
    (c) switchably supplying an operating voltage to a selected one of said detecting devices depending on the control signals from the outside of said rotating body at a predetermined timing before activation of said switching means for said selected detecting device, (d) applying the control signals to said switching means by a first electromagnetic signal-transmission means from outside said rotating body in no relation to the revolution of the rotating body, and (e) taking said serially delivered electrical signals out of said rotating body by a second electromagnetic signal-transmission means in no relation to angular orientation of the rotating body, to thereby allow high-speed measurements of different physical quantities on a time-shared basis.

2. A method of measuring physical quantities of a rotating body at many measuring points thereof, comprising the steps of:

(a) converting said physical quantities to corresponding electrical signals by detecting devices provided at said measuring points, (b) changing over switching means incorporated in said rotating body and connected with output terminals of said detecting devices, in response to control signals from outside of said rotating body so as to serially deliver said electrical signals, (c) applying the control signals to said switching means by a first electromagnetic signal-transmission means from outside said rotating body in no relation to the revolution of the rotating body, (d) taking said serially delivered electrical signals out of said rotating body by a second electromagnetic signal-transmission means in no relation to the revolution of the rotating body, to thereby provide revolution-free, substantially simultaneous measurements of different physical quantities in a time-sharing form, (e) measuring output voltages of a measuring circuit for measuring physical quantities when no voltage is applied to said detecting devices, (f) measuring output voltages of said measuring circuit when a voltage is applied to said detecting devices and when the physical quantities are all zero, (g) temporarily storing the measured output voltages in a zero point correcting circuit, and (h) arithmetically operating said stored output voltages and output voltages of said detecting devices delivered, when said detecting devices, upon activation, generate electrical signals corresponding to significant physical quantities, so as to automatically correct the shift of the zero point of the whole measuring circuit.

3. A method as claimed in claim 2, wherein said control signals comprise gain-change signals for changing the gain of a dc amplifier incorporated in the rotating body, said dc amplifier amplifying the output of selected one of said detecting devices.

4. A method as claimed in claim 2 or 3, wherein said measuring circuit on the rotating body side comprises multiplexer units each having a group of the switching means for a group of the detecting devices and responsive to said control signals for selectively activating the detecting devices and the switching means, said multiplexer units being separately and removably mounted on the rotary body.

5. A method as claimed in claim 2, further comprising the step of applying electric power received independently of said control signals by an electric power receiving means located on said rotating body to energize said detecting devices and said switching means.

6. A measuring system for measuring physical quantities of a rotating body at a plurality of measuring points thereof, said system comprising:

(a) a plurality of detecting means within said rotating body for converting said physical quantities into corresponding electrical signals, (b) first and second gating means within said rotating body for supplying an operating voltage selectively to said detecting means and for gating said electrical signals upon application of control signals, respectively, said first gating means being activated at a predetermined timing before activation of said second gating means, (c) means outside said rotating body, including a first winding spaced from said body for applying control signals to said rotating body, (d) receiving means within said rotating body, including a second winding on said body for receiving the applied signals, said first and second windings being arranged to electromagnetically couple the control signals at any time independently of the revolution of the rotating body, (e) control means within said rotating body responsive to the control signals from said receiving means for generating at least switching signals for said gating means, and (f) measured signal transmission means including a third winding on said rotating body and connected to said gating means and a fourth winding spaced from and outside said body, said third winding and fourth winding being arranged to electromagnetically couple output signals of said gating means outside said rotating body, whereby said output signals can be taken out of said rotating body to provide revolution-free, substantially simultaneous measurements including a slowly varying characteristic and a rapidly varying characteristic of different physical quantities.

7. The system as claimed in claim 6, wherein a plurality of multiplexer units are provided separately and detachably on said rotating body, corresponding to groups of the detecting means equal in number to the number of said multiplexer units, each multiplexer unit comprises said gating means connected to the detecting means of a corresponding group, one of said control means and a voltage source responsive to the output of said one of control means for activating the group of detecting means.

8. The system as claimed in claim 7 wherein a gain-varied dc amplifier is provided within the rotating body in common to said plurality of multiplexer units and responsive to the control signals from the multiplexer unit on activation for varying the gain thereof, said dc amplifier amplifying the output of said gating means.

9. A measuring system for measuring physical quantities of a rotating body at a plurality of measuring points thereof, said system comprising:

(a) a plurality of detecting means within said rotating body for converting said physical quantities into corresponding electrical signals, (b) a plurality of gating means within said rotating body for gating said electrical signals upon application of control signals, (c) means outside said rotating body, including a first winding spaced from said body for applying control signals to said rotating body, (d) receiving means within said rotating body, including a second winding on said body for receiving the applied signals, said first and second windings being arranged to electromagnetically couple the control signals at any time independently of the revolution of the rotating body, (e) control means within said rotating body responsive to the control signals from said receiving means for generating at least switching signals for said gating means, (f) measured signal transmission means including a third winding on said rotating body and connected to said gating means and a fourth winding spaced from and outside said body, said third winding and fourth winding being arranged to electromagnetically couple output signals of said gating means outside said rotating body, whereby said output signals can be taken out of said rotating body to provide revolution-free, substantially simultaneous measurements including a slowly varying characteristic and a rapidly varying characteristic of different physical quantities, wherein a plurality of multiplexer units are provided separately and detachably on said rotating body, corresponding to groups of the detecting means equal in number to the number of said multiplexer units, each multiplexer unit comprises said gating means connected to the detecting means of a corresponding group, one of said control means and a voltage source responsive to the output of said one of control means for activating the group of detecting means, and wherein said measured signal transmission means includes on the rotating body side, an analog-to-digital converter for converting the output of the gating means to a digital signal, and means for frequency-modulating a single carrier with said converted signal for transmission through said third winding outside said rotating body.

* * * * *